US005919047A

United States Patent [19]

Sone

[11] Patent Number: 5,919,047

[45] Date of Patent: Jul. 6, 1999

[54] KARAOKE APPARATUS PROVIDING CUSTOMIZED MEDLEY PLAY BY CONNECTING PLURAL MUSIC PIECES

[75] Inventor: Takurou Sone, Hamamatsu, Japan

[73] Assignee: Yamaha Corporation, Hamamatsu-shi, Japan

[21] Appl. No.: 08/806,068

[22] Filed: Feb. 24, 1997

[30] Foreign Application Priority Data

Feb. 26, 1996 [JP] Japan .................................... 8-037913

[51] Int. Cl.[6] ............................ G09B 15/04; G10H 1/36; H04N 5/76

[52] U.S. Cl. ................................ 434/307 A; 434/307 R; 84/477 R; 84/610; 386/102; 386/97; 360/72.2; 348/484

[58] Field of Search ...................... 434/118, 307 R–309, 434/318, 365; 84/477 R, 301–304, 309–315, 645, 638, 478; 360/32, 33.1, 77.01, 72.2; 386/96, 97, 68, 77, 106, 102; 380/3; 381/51; 348/476, 571, 595, 678, 738, 484; 369/32, 48, 50, 70, 134, 178, 192

[56] References Cited

U.S. PATENT DOCUMENTS 5,295,123 3/1994 Seri et al. .
5,347,082 9/1994 Ojima .
5,386,081 1/1995 Nakada et al. .
5,454,723 10/1995 Horii .
5,486,645 1/1996 Suh et al. .
5,494,443 2/1996 Nakai et al. ........................ 434/307 A
5,499,922 3/1996 Umeda et al. ...................... 434/307 A
5,510,573 4/1996 Cho et al. ................................ 84/610
5,542,000 7/1996 Semba .......................................... 381/61
5,574,239 11/1996 Kang et al. .............................. 84/610
5,747,716 5/1998 Matsumoto .............................. 84/609
5,781,683 7/1998 Sakoguchi et al. .................. 386/97 X
5,797,752 8/1998 Umezawa ............................ 434/307 A

*Primary Examiner*—Joe H. Cheng
*Attorney, Agent, or Firm*—Pillsbury, Madison & Sutro LLP

[57] ABSTRACT

In a karaoke apparatus, a music selector device selects a plurality of desired music pieces so as to compose a medley. A designator device designates a desired section of each music piece selected by the music selector device. A sequencer device sequentially plays back the designated sections of the selected music pieces to perform the medley. A connecting device operates when the performed medley switches from a preceding section of one music piece to a succeeding section of another music piece to musically connect the preceding section to the succeeding section by different transition modes. A mode selector device selects an optimal one of the different transition modes according to musical properties of the one music piece and the other music piece so as to musically ensure smooth connection between the preceding section and the succeeding section.

11 Claims, 8 Drawing Sheets

KARAOKE APPARATUS PROVIDING CUSTOMIZED MEDLEY PLAY BY CONNECTING PLURAL MUSIC PIECES

BACKGROUND OF THE INVENTION

The present invention relates to a karaoke apparatus for extracting partial performance sections from a plurality of music pieces and for smoothly linking or connecting these partial performance sections to provide medley play.

In the conventional karaoke apparatus, karaoke music data of karaoke music pieces are played back a piece by piece. Further, the karaoke apparatus can provide a medley in which each main section called sabi of a plurality of music pieces are sequentially connected to each other. Therefore, many karaoke singers prefer to the medley.

As described, the medley is composed of a plurality of music pieces. The medley is provided in the form of a composite karaoke music piece. The plurality of music pieces that constitute a medley are independently registered in the karaoke apparatus. It is necessary to compose the medley separately from these individual music pieces. Consequently, in registering karaoke music pieces into the karaoke apparatus, a composite music piece of the medley must be registered separately from the individual karaoke music pieces. This causes much expense in time and effort. Further, there is a considerable time lag between the registration of individual music pieces and the registration of a composite music piece of medley composed of the individual music pieces. In addition, the registration or reservation of the ready-made medley consumes the same data volume as that of the individually registered music piece, so that a data storage area for the medley must be provided additionally. Further, favorite music pieces that karaoke singers want to sing are not always adopted into the medley, so that the registered medley is not always a favorite one for the karaoke singers.

On the other hand, another karaoke apparatus has been proposed in which main sections are specified and cut out from a plurality of karaoke music pieces and the specified main sections are played sequentially. In this karaoke apparatus, however, the specified sections are simply played back sequentially so that joints or connections between the sections are not smooth to make the custom-made medley less appealing to ear than the before-mentioned ready-made medley, thereby somewhat discouraging karaoke singer's eagerness to sing.

SUMMARY OF THE INVENTION

It is therefore an object of the present invention to provide a karaoke apparatus that smoothly links desired performance sections of karaoke music pieces without discontinuity, thereby enabling natural medley play.

The inventive karaoke apparatus comprises a music selector device that selects a plurality of desired music pieces so as to compose a medley, a designator device that designates a desired section of each music piece selected by the music selector device, a sequencer device that sequentially plays back the designated sections of the selected music pieces to perform the medley, a connecting device that operates when the performed medley switches from a preceding section of one music piece to a succeeding section of another music piece to musically connect the preceding section to the succeeding section by different transition modes, and a mode selector device that selects an optimal one of the different transition modes according to musical properties of said one music piece and said another music piece so as to musically ensure smooth connection between the preceding section and the succeeding section. For example, the music selector device selects at least three music pieces so that the medley contains at least two connections in a sequence of the designated sections, and the mode selector device can select different transition modes for the respective connections so as to individually optimize each of the connections. The mode selector device selects an optimal one of the different transition modes according to the musical properties of said one music piece and said another music piece in terms of at least one of volume, tempo, time and key.

In a specific form, the mode selector device selects a direct transition mode such that the preceding section is directly connected to the succeeding section when the musical properties of said one music piece and said another music piece are compatible with one another, and otherwise selects an indirect transition mode such that the preceding section is indirectly connected to the succeeding section through a transient interval when the musical properties of said one music piece and said another music piece are not compatible with one another so that the transient interval can smoothly connect the preceding section to the succeeding section. For example, the mode selector device selects the indirect transition mode in which the preceding section fades out and the succeeding section fades in during the transient interval. Otherwise, the mode selector device selects the indirect transition mode in which a bridge section is fitted into the transient interval between the preceding section and the succeeding section so that the bridge section musically bridges therebetween. In such a case, the karaoke apparatus further comprises an editor device that edits the bridge section according to the musical properties of said one music piece and said another music piece in terms of at least volume, tempo, time and key so that the musical property of the bridge section is compromised to ensure the smooth connection between the preceding section and the succeeding section. Preferably, the inventive karaoke apparatus further comprises a pair of tone generator devices that are activated to generate musical tones of the medley, and the sequencer device activates one tone generator device when playing back the preceding section and activates the other tone generator device when playing back the succeeding section.

According to the present invention, a plurality of desired karaoke music pieces are specified or selected. Then, performance sections of the specified karaoke music pieces are specified or designated. The plurality of karaoke music pieces may be specified collectively before starting performance of the medley. Otherwise, the desired music pieces may be selected individually one after another during performance of the medley. In the collective editing of the medley, a list of music pieces may be prepared beforehand instead of selecting the plurality of music pieces. The designated performance section may be a most significant passage in the selected music piece in general. If desired, however, other performance sections such as a first chorus part of the music piece may also be designated. The performance sections thus specified are played back consecutively.

In this consecutive or sequential performance of the medley, musical properties of the selected music pieces such as volume, tempo, time, beat, and key may often be inconsistent or discontinuous between a trailing edge of one performance section of a preceding music piece and a leading edge of another performance section of a succeeding or subsequent music piece. In such a case, if the medley is played back without modification, the joint or connection between the preceding and succeeding performance sections sounds very unnatural, thereby discouraging the eagerness of karaoke singer to sing. To solve this problem, the connecting device needs to deal with these musical properties (at least volume) in order to smoothly connect or link the sections at the joint between the music pieces. For the transition modes or linking schemes, joining, cross-fading, and bridging are available. One of these schemes is selected to optimize the connection between the sections. The mode selection may be performed automatically by the karaoke apparatus or manually by the karaoke user (singer). Further, the linking scheme selection may be performed at every joint of the music pieces to select the most suitable or optimal one for each of the music pieces to be played back consecutively.

BRIEF DESCRIPTION OF THEE DRAWINGS

FIGS. (7A)–(7C) are a diagram illustrating various linking modes used when the inventive karaoke apparatus practices medley performance.

Figure 8:
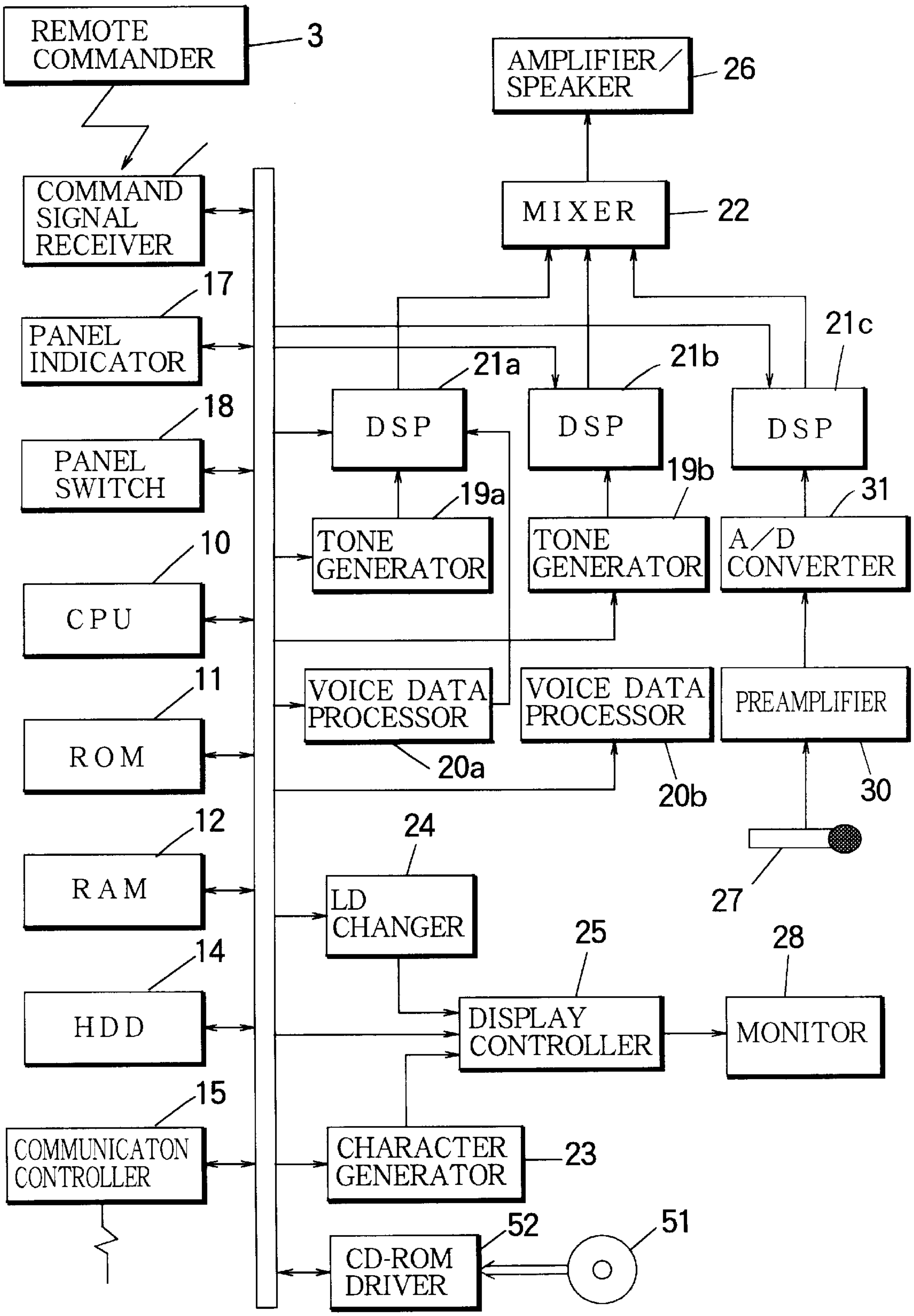

FIG. 8 is a block diagram illustrating another embodiment of the inventive karaoke apparatus.

DETAILED DESCRIPTION OF THE INVENTION

This invention will be described in further detail by way of example with reference to the accompanying drawings. The karaoke apparatus according to the present invention stores about 10,000 pieces of music in a hard disk, and has an ordinary karaoke performance capability of playing back a desired music piece specified by the user. In addition, this karaoke apparatus has a so-called medley performance capability of playing sequentially and consecutively a plurality of music pieces specified totally or individually without break. The medley performance capability extracts only the most popular or significant section (so-called sabi) of each piece of karaoke music, and links or connects the extracted sections to form a medley.

Figure 1:
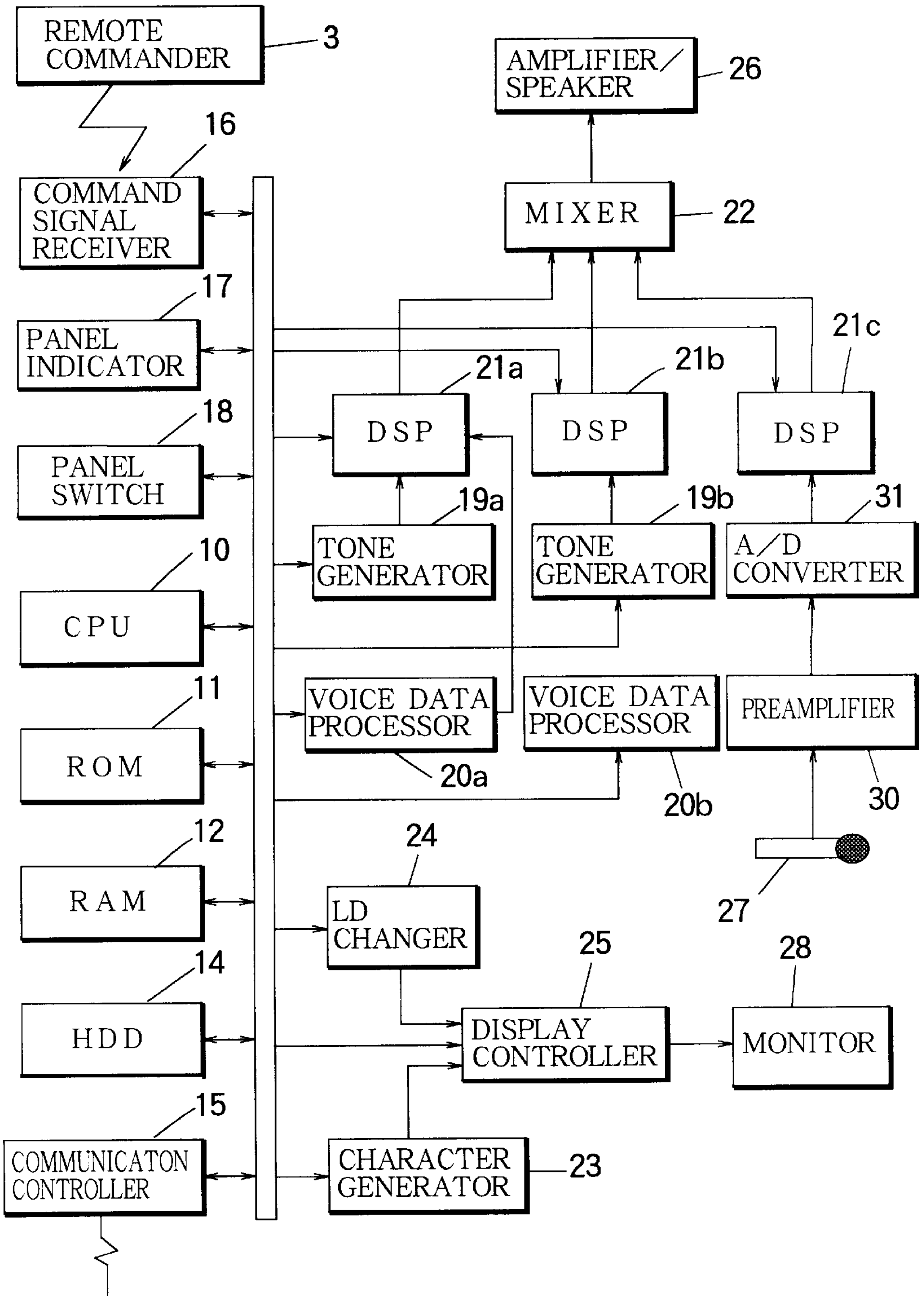
FIG. 1 is a block diagram illustrating a karaoke apparatus having medley playing capability practiced as one embodiment of the present invention.

FIG. 1 is a block diagram illustrating a karaoke apparatus having the above-mentioned medley performance capability. A CPU 10 that controls the entire system of the karaoke apparatus is connected via a bus to those of a ROM 11, a RAM 12, a hard disk drive (HDD) 14, a communication controller 15, a remote command signal receiver 16, a panel indicator 17, a panel switch 18, a pair of tone generators 19*a* and 19*b*, a pair of voice data processors 20*a* and 20*b*, effect DSPs 21*a*, 21*b*, and 21*c*, a mixer 22, a character generator 23, an LD changer 24, and display controller 25. The mixer 22 is connected to an amplifier/speaker 26. The effect DSP 21*c* is connected to a vocal microphone 27 through an A/D converter 31 and a preamplifier 30. The display controller 25 is connected to a monitor 28. These amplifier/speaker 26, vocal microphone 27, and monitor 28 are provided separately from a main frame of the karaoke apparatus.

The ROM 11 stores a system program, application programs, a loader, font data, and so on. The system program controls the basic operation of this karaoke apparatus and the data transfer to and from peripheral devices. The application programs include peripheral device control programs and a sequence program. The sequence program is executed when karaoke performance is commenced to sequentially feed karaoke music data from a work area of the RAM 12 to the tone generators 19*a* and 19*b* and to the character generator 23 based on a clock signal, thereby generating musical tone signals and displaying lyrics words. In the medley performance mode, in order to make the joint or connection between a preceding music piece and a succeeding music piece smoothly, data reading sequences of the preceding and the succeeding pieces are performed in parallel manner. The loader downloads musical data for karaoke performance from a center (not shown) via the communication controller 15. The font data are used to display lyrics words and titles of music pieces. For the font data, a plurality of fonts such as mincho and gothic are stored. The RAM 12 is set with a work area for executing karaoke performance. The musical data of karaoke music pieces reserved for performance are written into this work area of the RAM 12 from the HDD 14 beforehand. For execution of the medley performance mode, the RAM 12 is set with two work areas of this type. The RAM 12 is also set with a list of reserved music pieces that registers a plurality of music piece numbers reserved for karaoke performance. The communication controller 15 downloads the musical data for karaoke performance from the center, and writes the downloaded data into the HDD 14. The communication controller 15 incorporates a DMA circuit, and therefore can write the downloaded musical data directly into the HDD 14 without transferring the data to the CPU 10. The HDD 14 is provided with a musical data storage area for storing the downloaded data representative of about 10,000 music pieces. In addition, the HDD 14 is provided with an area for storing a medley list which registers or lists a set of karaoke music pieces to be played in medley. The medley list can be designated by a medley code which is treated in similar manner as an ordinary music piece code. When desired one of the medley codes is designated, the karaoke apparatus automatically enters into the medley performance mode to play back the medley of karaoke music pieces registered in the designated medley list.

The remote command signal receiver 16 receives an infrared signal transmitted from a remote commander 3 and decodes the received signal. The commander 3 has various key switches such as numeric keys and mode select keys. When the user operates these keys, the remote commander 3 transmits the infrared signal modulated by a code corresponding to the key operation. The user can enter a code of a desired music piece into the karaoke apparatus by means of these key switches. Further, operating the mode select switch allows the user to switch between the medley performance mode and the normal performance mode in which one piece of music is played in the regular manner.

The panel indicator 17 includes an LED display device for displaying the entered code of the music piece. In addition to the numeric keys, the panel switch 18 includes key switches of the same type as that of the remote commander 3. By operating the panel switch 18, the user can also enter music piece codes.

As described, the karaoke apparatus has two systems a and b of karaoke performance channels, each of which is composed of the tone generator 19, the voice data processor 20, and the effect DSP 21. This is because the medley performance of a preceding music piece and the medley performance of a succeeding music piece are carried out by the separate systems a and b in order to join both smoothly when the preceding music piece is switched to the succeeding music piece under the medley performance mode. In the normal performance mode in which only one piece of music is played back, any one of the two systems may be used. Otherwise, both the systems may be operated to produce profound music tones.

The two systems a and b have the same construction. For example, in the system a, the tone generator 19*a* generates a musical tone signal based on event data inputted from the CPU 10 to play back karaoke performance. The event data are written on a musical sound track of the karaoke musical data to control note-on/note-off of the musical sound. The voice data processor 20*a* creates voice signals such as back chorus based on voice data. The voice data are obtained by ADPCM of a voice waveform representative of a back chorus, which is hardly generated electronically by the tone generator 19*a*. The voice data processor 20*a* decompresses or expands the ADPCM voice data and outputs the resultant data. The effect DSP 21*a* applies various effects to the musical tone signal inputted from the tone generator 19*a* and to the voice signal decompressed by the voice data processor 20*a*. The resultant karaoke performance sound is outputted to the mixer 22.

On the other hand, the vocal microphone 27 is connected to the preamplifier 30. A singing voice signal inputted from the microphone 27 is amplified by the preamplifier 30. The preamplified signal is converted by the A/D converter 31, and the converted signal is inputted into the effect DSP 21*c*. The effect DSP 21*c* applies an effect such as echo to the singing voice signal and outputs the resultant signal to the mixer 22. The mixer 22 mixes the karaoke performance sounds inputted from the DSPs 21*a* and 21*b* with the singing voice signal inputted from the DSP 21*c* at an appropriate ratio, then converts the mixed digital signal into an analog signal, and outputs the analog signal to the amplifier/speaker 26. The amplifier/speaker 26 amplifies this analog signal and sounds the amplified signal. It should be noted that kinds of the effects provided by the DSPs 21*a*, 21*b*, and 21*c* and the degrees of these effects are controlled by DSP control data inputted from the CPU 10. The DSP control data are written on a DSP control track of the karaoke musical data along with interval time data, and are retrieved at predetermined timings during the karaoke performance by the CPU 10 so as to feed the DSPs.

The character generator 23 is provided with character display data for displaying titles and lyrics of karaoke music pieces. The character display data are written to a character display track of the karaoke musical data. The character display data are implemented along with time interval data (delta time data) such that the titles and lyrics are displayed while changing their colors in synchronization with karaoke performance which is controlled according to the above-mentioned musical sound track. Based on the character display data, the character generator 23 generates character patterns representative of titles and lyrics. On the other hand, the LD changer 24 reproduces a background image from a laser disc during the karaoke performance. The CPU 10 determines the background image based on genre data of selected or requested karaoke music pieces, and transmits a chapter number of the determined image to the LD changer 24. The LD changer 24 selects the background image according to the chapter number specified by the CPU 10 from a plurality (about five) of laser discs, and reproduces the selected background image. The character patterns generated by the character generator 23 and the background image reproduced by the LD changer 24 are inputted into the display controller 25. The display controller 25 superimposes the character patterns on the background image, and displays the composite image on the monitor 28.

Figure 2:
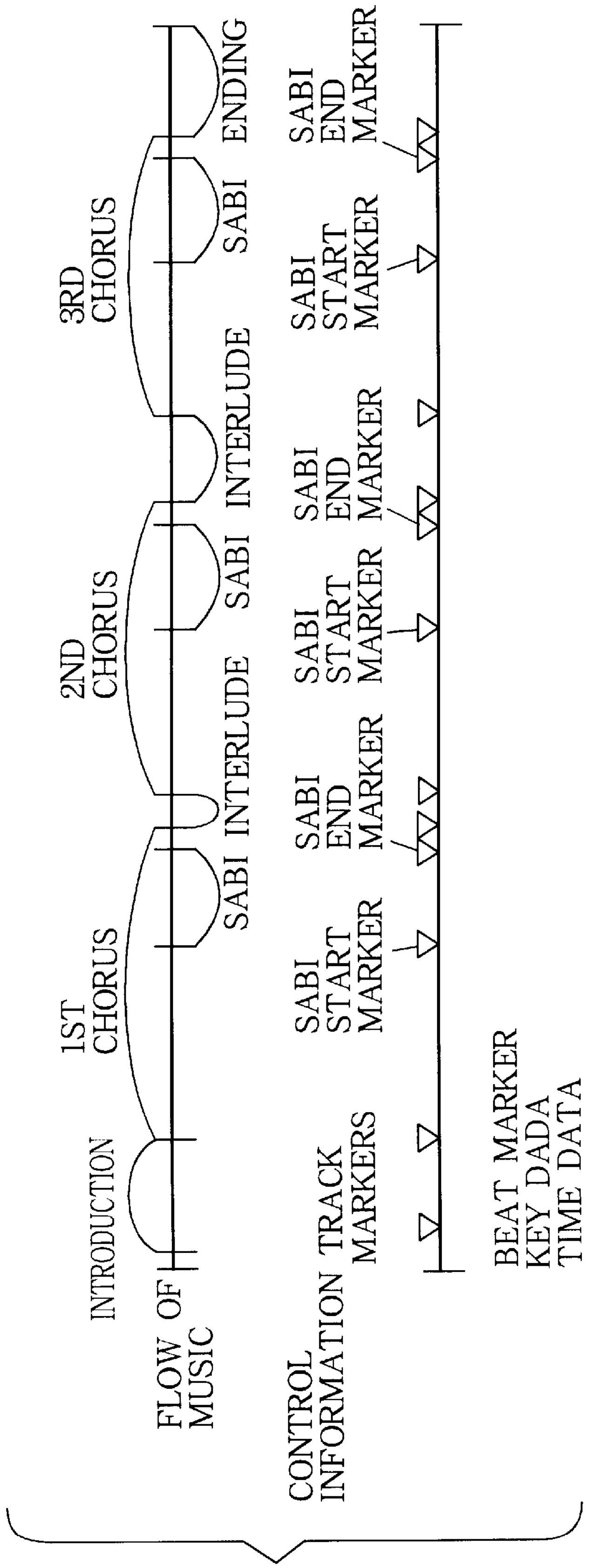
FIG. 2 is a diagram showing progression of a karaoke music piece to be played in the inventive karaoke apparatus.
Figure 3:
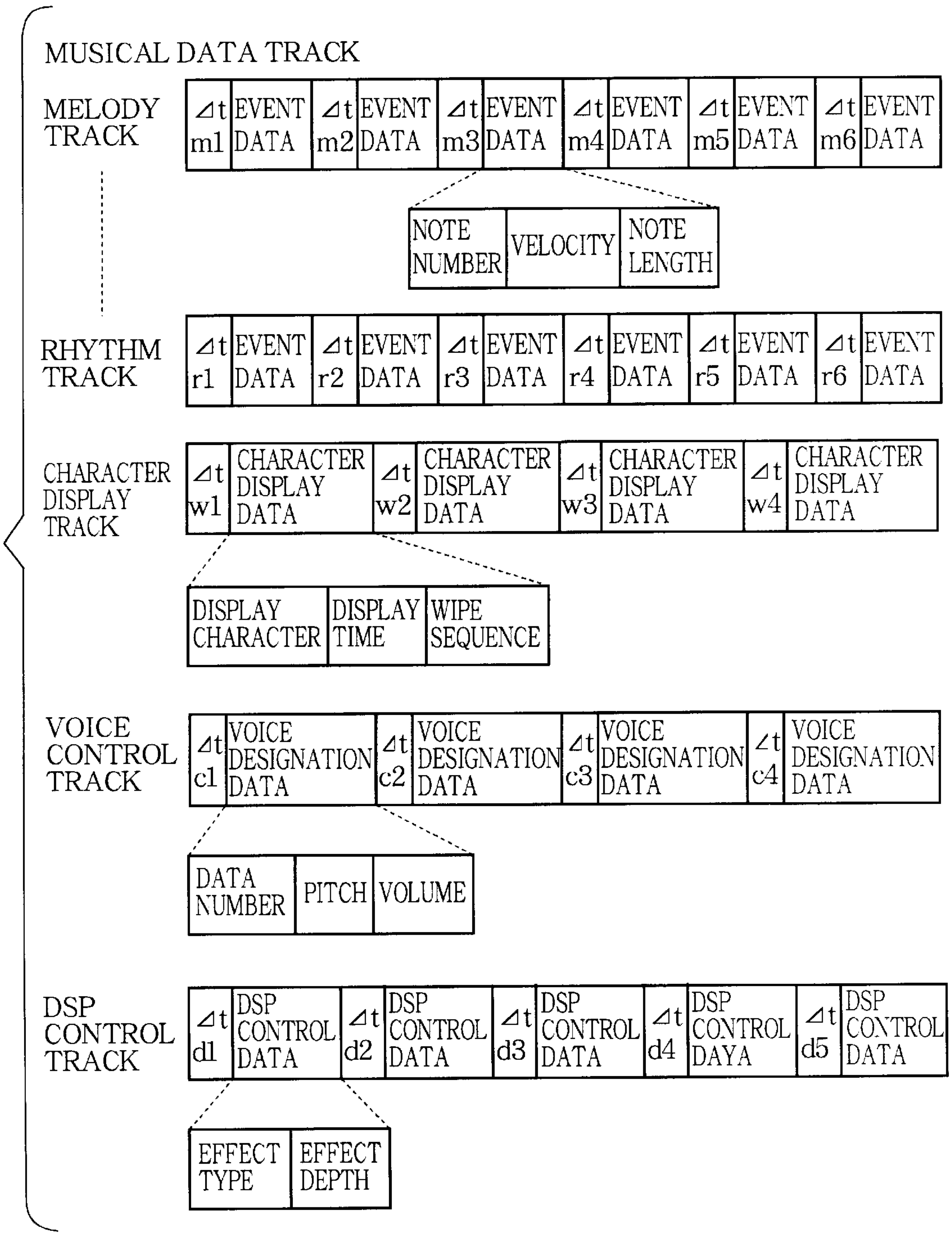
FIG. 3 is a diagram showing a data format of a music piece processed in the inventive karaoke apparatus.

FIG. 2 is a diagram illustrating flow of a typical karaoke music piece played back by the karaoke apparatus and general constitution of the musical sound data of the karaoke music piece. FIG. 3 is a diagram illustrating data configuration of the various tracks provided in the karaoke musical data. In addition to the musical sound track for karaoke performance, the karaoke musical data contains the character display track, the voice control track and the DSP control track as well as a control information track, a voice data block, and a header.

In FIG. 2, the typical karaoke music piece has an introduction, a first chorus, a second chorus, a third chorus and an ending, and includes the most significant or popular section (sabi) in each chorus. Generally, an interlude is inserted between the first and second choruses and/or between the second and third choruses. The control information track or index track is written with an introduction start marker, a first chorus start marker, a second chorus start marker, a third chorus start marker, an ending start marker, an interlude start marker, a sabi start marker, and a sabi end marker. In addition, the control information track is written with data concerning setting and change of keys (C major, A minor and so on) and beats (quadruple time, triple time and so on) and data concerning beat times and beat numbers thereof (first beat, second beat and so on). It is also practical to write in the control information track markers of a first chorus fade point and a second chorus fade point, for example, in order to execute first chorus fade-out and second chorus fade-out controls.

The musical sound track is implemented with event data for playing all of the above-mentioned sections of introduction, first chorus, second chorus, third chorus, ending and interlude. The musical sound track is composed of a plurality of subtracks corresponding to a plurality of parts such as melody, piano, strings, and rhythm. For example, as shown in FIG. 3, the melody track is composed of the event data for indicating note-on or note-off of musical tones and the delta time data ($\Delta t$) representing read timing of the event data in terms of a time interval between adjacent notes of the event data. In addition to the note-on data and note-off data indicating vocalization and muting of the musical tone, the event data includes parameter change data, program change data and so on for adjusting and changing timbre of the musical tones. Based on the sequence programs the CPU 10 reads the event data from this track. When the delta time data is read, the same is down-counted in synchronization with a tempo clock. When the count has reached 0, next event data is read. When the event data is read, the same is outputted to the tone generator 19*a* or 19*b*.

The character display track is written with sequence data representative of the title and lyrics of the karaoke music piece. The sequence data includes character display data in the form of event data and the delta time data indicating a time interval between adjacent ones of the event data. It should be noted that the event data on the character display track are not general-purpose MIDI data, but the character display track as well as the voice track and the DSP control track is formed according to MIDI format in order to provide consistent implementation to facilitate data formating work process. The character display data represents one line of lyrics words, display coordinates of the lyrics words, and wipe sequence for controlling character color change and character wiping.

The voice control track controls reproduction timings of the voice data representative of a plurality of back choruses stored in the voice data block, and is composed of voice designation data which is event data and the delta time data. The voice designation data determines which one of voice data is to be pitch-shifted at a given frequency and vocalized at a given volume.

The DSP control track is constituted by event data for controlling the effect DSPs 21*a*, 21*b*, and 21*c* and the delta time data. The event data indicates which kind of effects is to be applied to a musical sound signal by a given degree.

It should be noted that a start section (preceding the introduction start marker) of each track is collectively written with event data for resetting and initializing the tone generators 19*a* and 19*b* and the DSPs 21*a*–21*c* before commencing karaoke performance. The header is composed of various data (code, title, release date, playing time of music). The genre data of the music piece may be included in the header, or may be provided as separate data.

In the usual karaoke performance, the above-mentioned musical sound track, character display track, voice control track, DSP control track and control information track are read in synchronization with a common clock signal. Otherwise, in the novel karaoke apparatus, each track can be read independently of the other tracks based on different clock signals. This enables so-called trick plays such as pausing halfway and synchronizing with another track halfway. This capability is used in the medley performance mode or else.

Figure 4:
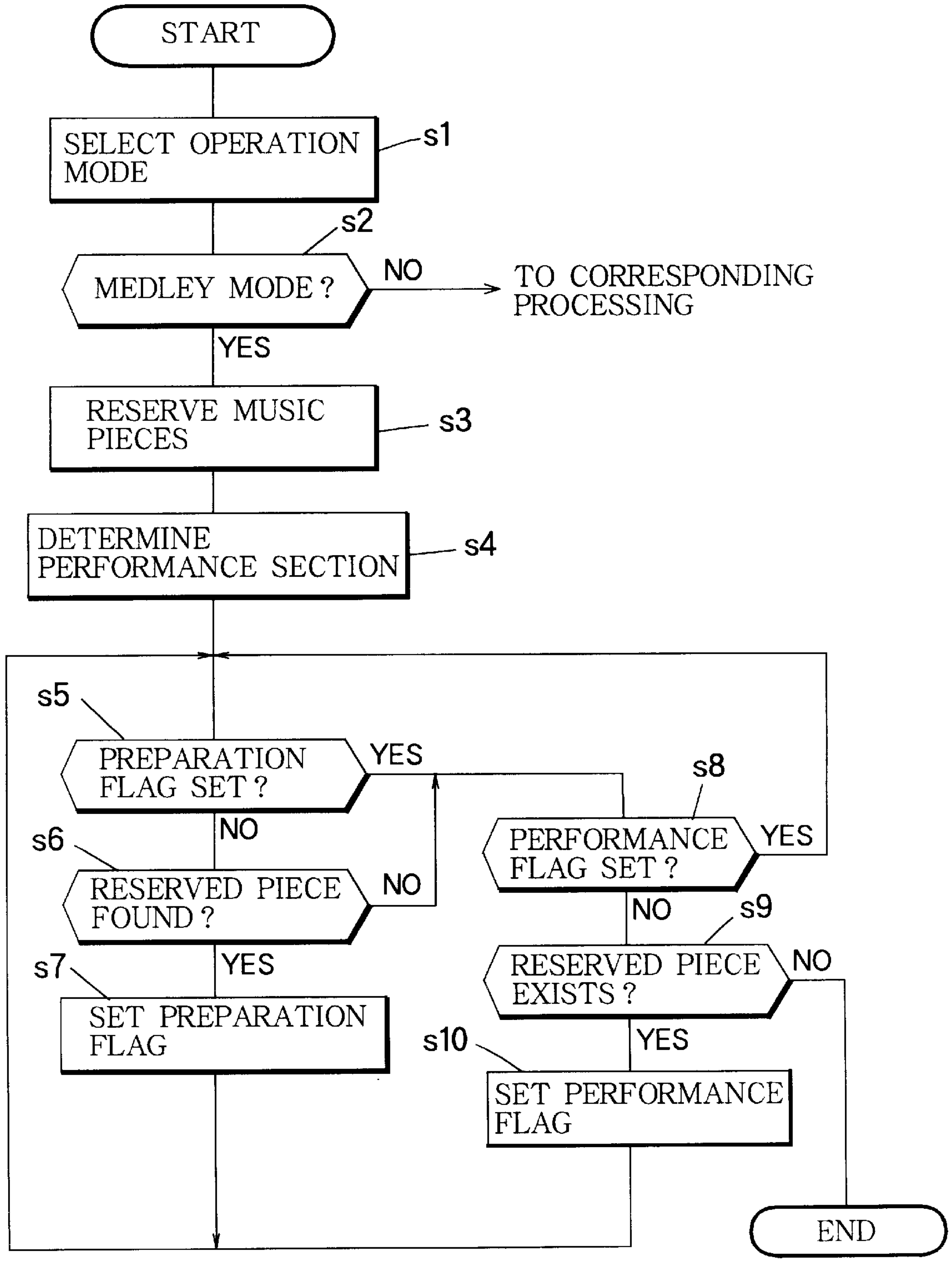
FIG. 4 is a flowchart describing operation of the inventive karaoke apparatus.
Figure 5:
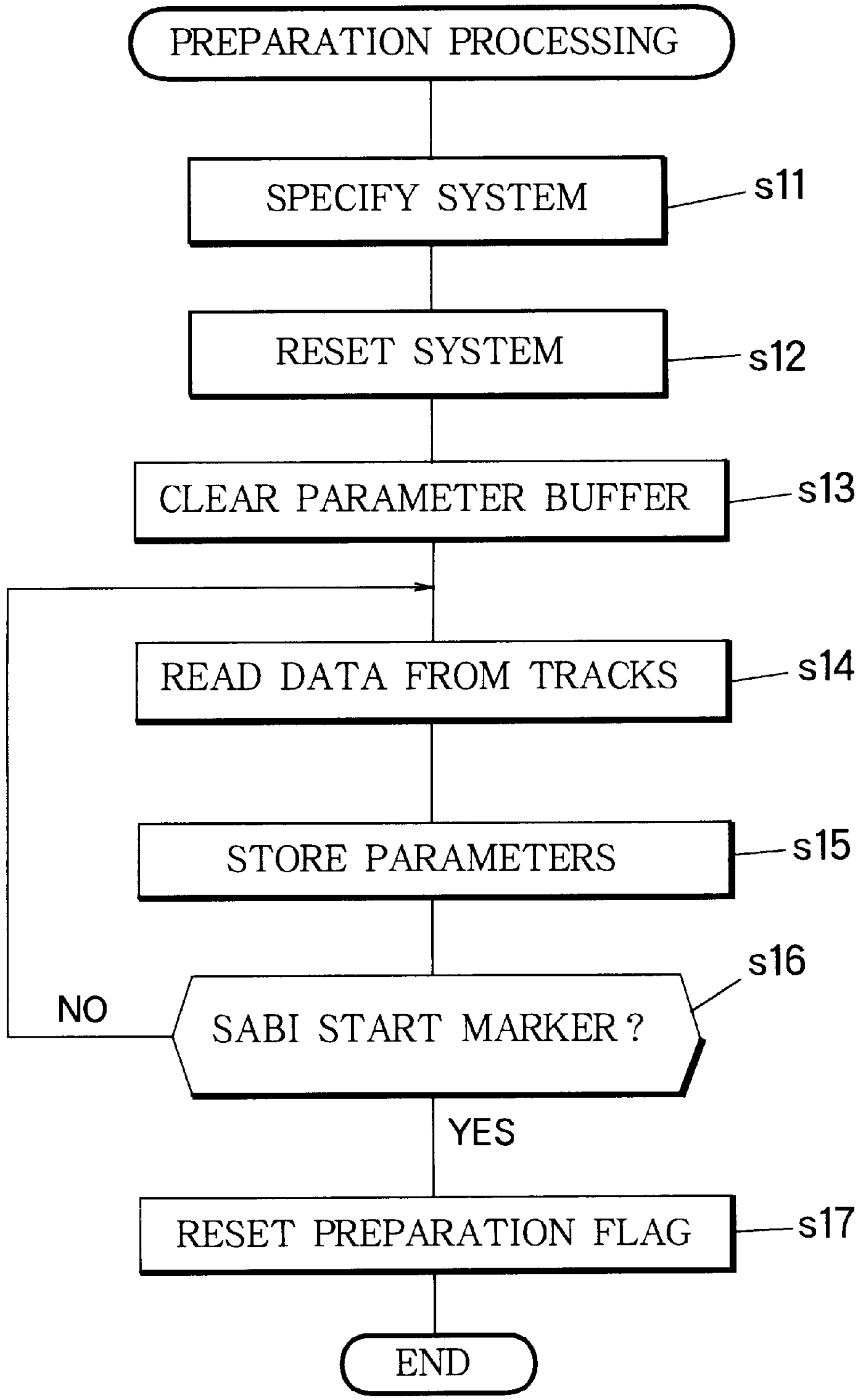
FIG. 5 is another flowchart describing the operation of the inventive karaoke apparatus.
Figure 6:
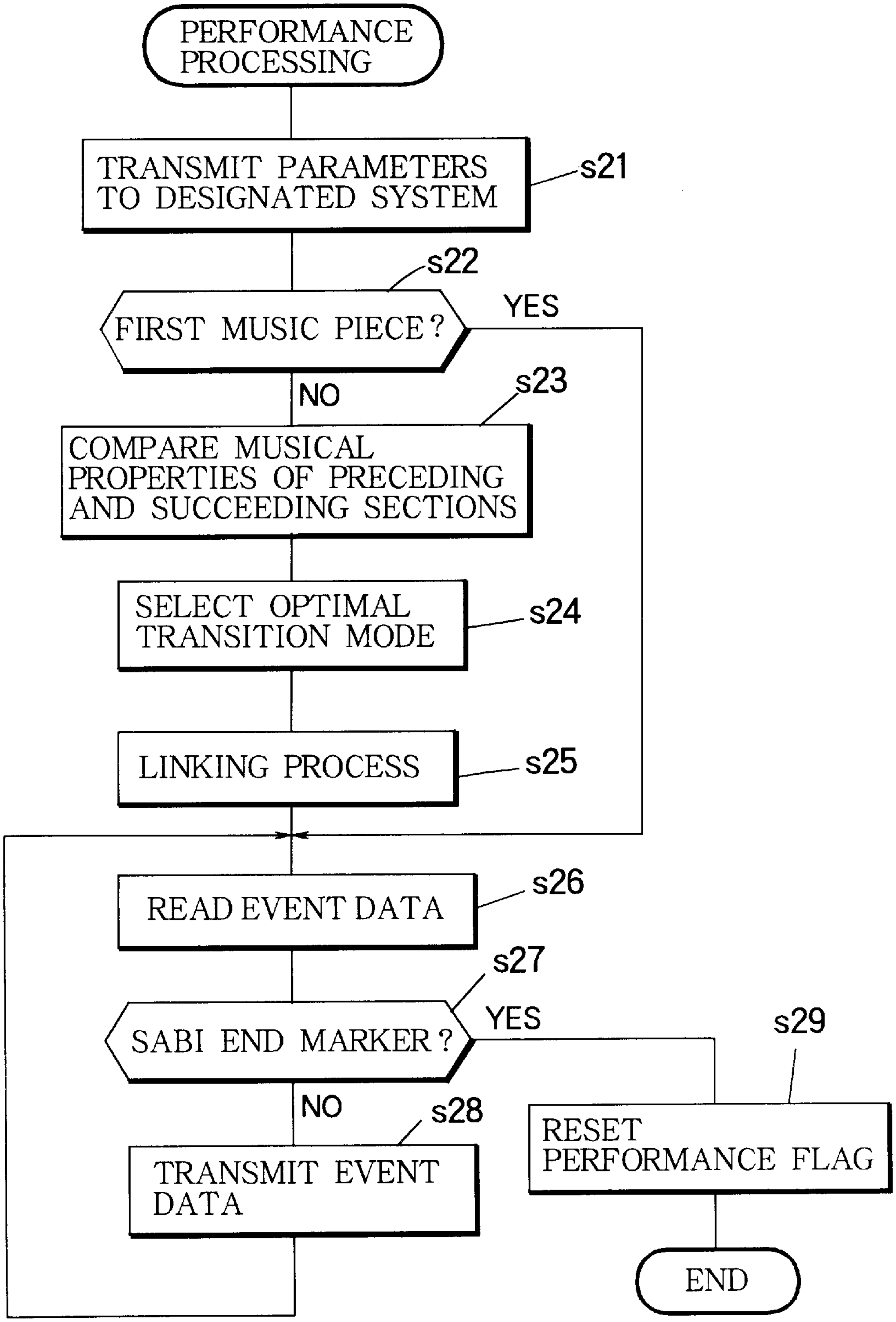
FIG. 6 is a further flowchart describing the operation of the inventive karaoke apparatus.

FIGS. 4 through 6 are flowcharts describing the operation of the inventive karaoke apparatus. FIG. 4 shows the operation in the medley performance mode. When the user selects a desired one of operation modes (s1), the selected mode is determined in step s2. If the selected mode is the medley performance mode, the process in step s3 and subsequent steps will be executed. For other modes such as the normal performance mode in which only one piece of music is played, the corresponding processing is performed.

First, a music selector device implemented by the CPU is operated such that reservation or selection of a plurality of karaoke music pieces is accepted in step s3. In step s4, a performance section or division of each karaoke music piece is determined by a designator device implemented in the CPU. It should be noted that the selection of the karaoke music pieces may be made by reading the above-mentioned medley list which collectively registers plural pieces of karaoke music, or otherwise by inputting music codes one by one. The designated performance division or section is typically a sabi section between the sabi start marker and the sabi end marker, unless otherwise specified. If the user specifies a particular performance division or a particular performance division is indicated in the medley list, the particular performance division is used for the melody play.

Next, it is determined whether a preparation flag is set or reset (s5), and it is determined whether a performance flag is set or reset (s8). The preparation flag is set at step s7 so that preparation processing operation of FIG. 5 is executed for a certain music piece. While these flags are set, another preparation processing operation and performance processing operation need not be newly initialed, so that the routine stays in the standby state through steps s5 and s8. When the routine enters this operation from step s4 for the first. time, no preparation processing operation is performed on any music piece, so that the routine goes from steps s5 and s6 to step s7 so as to set the preparation flag on condition that there is a music piece to be prepared for medley performance. When the preparation flag is set, the preparation processing operation shown in FIG. 5 is commenced on the reserved music piece of music. The preparation processing herein denotes pre-reading of each track up to the start point of the sabi section of this music piece.

On the other hand, when the performance flag is not set, the process goes from step s8 to step s9 to determine whether there is a reserved music piece. If the reserved music piece is found and the preparation processing has been terminated, the performance flag is set (s10). When the performance flag is set, the performance processing operation shown in FIG. 6 is commenced on the music piece which is treated by the preparation processing. Because the sabi section of this music piece is detected and indexed by the preparation processing, only this sabi section is played back in this performance processing.

FIG. 5 shows a flowchart describing the preparation processing operation. First, the karaoke performance system a or b in charge of this music piece is specified (s11), and the tone generator device and the DSP of this specified system are reset or initialized (s12). Then, a parameter buffer is cleared (s13). The parameter buffer temporarily holds parameters to be transmitted to the specified system a or b. Then, each track of the karaoke musical data of this music piece is read from the top of each track at about 100 times as fast as a speed of normal karaoke performance (s14) to update the parameter buffer with the parameters read from each track (s15). The parameter values transmitted to the same register are successively read so that the preceding one is overwritten by the succeeding one. Consequently, the set of parameters last read remain in the buffer. Upon reading of the sabi start marker (s16), the preparation flag is reset (s17) to terminate this operation. Thus, the parameter setting for medley performance of the sabi section in this karaoke music piece can be completed in the parameter buffer.

FIG. 6 shows a flowchart describing the performance processing operation. First, the parameters held in the parameter buffer by the preparation processing operation for the tone generator 19 and the DSP 21 of the system a or b that is designated to play this karaoke music piece are transmitted to buffers of the tone generator and DSP (s21). While link processing is performed by a connecting device implemented by the CPU, each operating block of the designated system is set to the sabi start state. Then, it is determined whether this music piece is the first one of the medley (s22). If this music piece is the first one, the sabi performance is started directly (s26) by means of a sequencer device implemented by the CPU. If this music piece is a second or subsequent one, the trailing end of the sabi section of a preceding music piece is compared with the leading end of the sabi section of a succeeding piece to detect a boundary between the preceding and succeeding music pieces (s23). Differences in musical properties such as volume and rhythm between the preceding and succeeding sabi sections are extracted. Based on the extraction, an optimal linking transition mode is selected (s24) by a mode selector device implemented in the CPU. The link processing is performed based on the selected linking transition mode (s25), and then performance of the succeeding sabi section is started (s26). In step s26, the event data of each track after the sabi start marker are read and transmitted to the corresponding processing blocks such as the tone generator 19 (s28). Then, when the sabi end marker is detected (s27), the performance flag is reset (s29), upon which this processing operation comes to an end.

In the above-mentioned operation, the karaoke apparatus automatically selects the optimal linking mode for each of connections during the medley performance. It will be apparent that this mode selection may be performed by the user. It will also be apparent that the optimal linking mode may be determined beforehand by comparing the musical properties at the boundary between the music pieces before the medley performance is started.

Figure 7A:
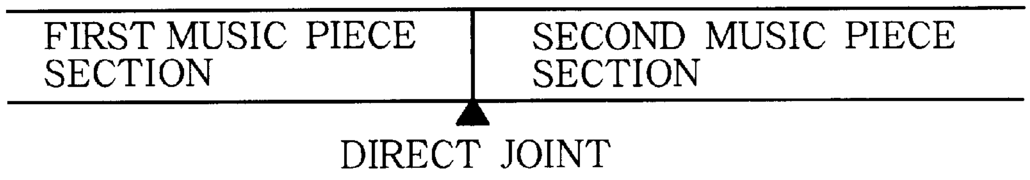
Figure 7B:
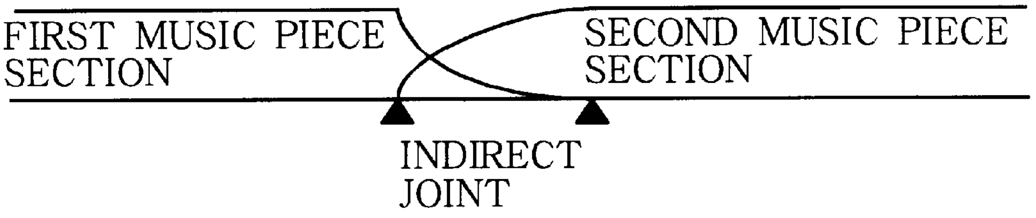
Figure 7C:
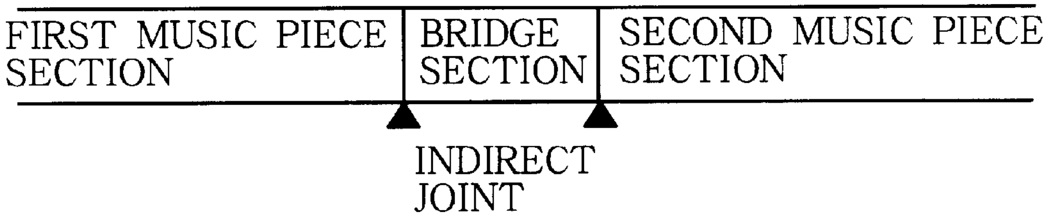

The following describes the link processing with reference to FIGS. 7(A)–7(C). The linking is available in three transition modes: joining, cross-fading, and bridging as shown in the figures. In the joining shown in FIG. 7(A), the performance division or section of the succeeding music piece is started in synchronization with the end timing indicted by the sabi end marker of the performance division of the preceding music piece. This direct transition mode or scheme is adopted when the volume, tempo, time, beat, and key of the preceding music piece all match with those of the succeeding music piece. This scheme is extremely simple and can link the preceding and succeeding music pieces without redundancy as far as the music properties of the preceding and succeeding music pieces are compatible with each other. If this scheme is applied, nothing is performed in the link processing of step s25.

In the cross-fading mode shown in FIG. 7(B), a passing division or section is provided in a transient interval between the end point of the performance division of the preceding music piece and the start point of the performance division of the succeeding music piece. In this passing division, the preceding music piece after the end of the performance division and the succeeding music piece before the start of the performance division are played in a superposed cross-fading manner. At this moment, by cross-fading the volume (gradually decreasing the volume of the preceding music piece and gradually increasing the volume of the succeeding music piece) in this passing division, musically smooth shift from the preceding music piece to the succeeding music piece is ensured. In this case, the beat of the preceding music piece can be matched with the beat of the succeeding music piece for more smooth linking by gradually shifting the transitional performance tempo from the previous tempo of the preceding music piece to the subsequent tempo of the succeeding music piece. That is, at the beginning of the passing division, the succeeding music piece is started at the previous tempo of the preceding music piece, and then both of the preceding and succeeding music pieces are gradually accelerated and decelerated, respectively, to reach the subsequent tempo of the succeeding music piece at the end of the passing division. It should be noted that the control information track of the karaoke musical data is written with the beat marker as described before to facilitate the processing of the beat matching. The cross-fading mode is adopted if the musical properties of the preceding and succeeding music pieces are not compatible to each other.

In addition, use of this passing division enables to display the title of the succeeding music piece. In this case, reading of the character display track of the preceding music piece is ended upon the end of the performance division of the preceding piece to thereby pass control of the character generator 23 to the succeeding music piece. In the sequence of the character display track of the succeeding music piece, the title display data (corresponding to the introduction of karaoke music) at the start section is read to display the title. Then, jump is made to the sabi start marker to display the lyrics upon starting the performance division of the succeeding music piece.

The lyrics words are displayed in one line or two lines at a time. When the displayed one line or two lines has been sung, next one line or next two lines is displayed. If the start point of the succeeding performance division is just after the last one line or two lines displayed at a time, the line switching must be very quickly, making it difficult for the singer to follow the displayed lyrics words. To prevent this problem, the current lines may be added to the succeeding one lines or two lines.

FIG. 7(C) is a schematic diagram illustrating the bridging mode. In bridging, an intermediate phrase or a bridge section is automatically generated based on the rhythms and chords of the preceding music piece and the succeeding music piece, and is inserted or fitted in a transient interval between the two music pieces. That is, this bridge section is generated such that the preceding and succeeding music pieces are smoothly linked to each other without inconsistency or discontinuity in all musical properties such as volume, tempo (beat timing), time or meter, key, and chord of the two music pieces. The two music pieces are indirectly connected to each other through the bridge section in this indirect transition mode.

The bridge section is automatically generated so as to satisfy the following conditions by an editor device implemented in the CPU. As for volume, smooth shift is made from the volume level at the end of the performance division of the preceding music piece to the other volume level at the top of the performance division of the succeeding music piece. As for tempo, smooth shift is made from the tempo value at the end of the performance division of the preceding music piece to the other tempo value at the beginning of the performance division of the succeeding music piece. If the times of the preceding and succeeding music pieces are different, a musical note eliminating the sense of time (for example, syncopation and half note triplet) or a rest is inserted to alter the time. If the rhythms of the preceding and succeeding music pieces are different, such a passage phrase as eliminating the sense of time and rhythm is inserted to alter the rhythm. If the keys of the preceding and succeeding music pieces are different, modulation is made by chord progression. In addition, the chord at the end of the performance division of the preceding music piece and the other chord at the beginning of the performance division of the succeeding music piece are linked together naturally by this chord progression.

Further, the bridge section can be formed as follows.

(1) For reproduction by matching the tempos of the preceding and succeeding music pieces:

Vocalize a drum sound and so on by beat timing at the end of the preceding music piece or several beats before the end of the preceding music piece. Further, vocalize the beat sound from the tone generator by which the preceding music piece has been played.

Even when the preceding music piece has come to an end, continue vocalization at the beat timing.

Start reproduction of the succeeding music piece in synchronization with the beat timing.

Stop the vocalization of the beat sound upon reproduction of the succeeding music piece or several beats thereafter.

(2) For reproduction with the tempos of the preceding anid succeeding music pieces while the tempos remain different:

Vocalize a beat sound several beats at the tempo of the succeeding music piece immediately after the end of the reproduced division of the preceding music piece.

Reproduce the succeeding music piece in synchronization with the beat sound.

Stop the vocalization of the beat sound upon reproduction of the succeeding music piece or several beats thereafter.

If the voice range of the preceding music piece differs significantly from that of the succeeding music piece as in the case of a song sung by a male singer and another song sung by a female singer, the succeeding piece may be transposed to match the voice range. In doing so, the above-mentioned matching of keys and chords must be made based on the transposed succeeding music piece.

The automatically generated bridge section is played back by the system assigned to the preceding music piece. In synchronization with the end of the bridge section, playback of the performance division of the succeeding music piece starts by use of the other system. The bridging scheme requires a great amount of processing work by the CPU 10, but is advantageous in that any music pieces can be linked together.

Selection of the above-mentioned linking schemes may be automatically made by the karaoke apparatus or made manually by the user considering the rhythms, tempos, beats, genres and so on of the preceding and succeeding music pieces.

A plurality of karaoke music pieces to be played in medley may all be reserved before starting the medley performance, or may be additionally designated during the medley performance (sequential reservation). That is, when a succeeding music piece is reserved before (for example 30 seconds) the end of a preceding music piece, the reserved music piece is automatically linked to the preceding music piece to form a medley.

It is also practical to prepare a medley list which records codes of a plurality of karaoke music pieces. This medley list may be designated for medley performance. To be specific, music piece codes, performance divisions, and linking schemes of a plurality of karaoke music pieces are written in the medley list beforehand. This list is identified by a particular code like an ordinary karaoke music piece. When the user specifies this list identification code, the karaoke apparatus is automatically switched to the medley performance mode to automatically play back the karaoke music pieces registered in the medley list.

Further, the user can create a custom medley list according to his or her desire. In this case, music piece selecting means classified by singer, genre and so on may be provided to allow the user to readily prepare the medley list. Still further, the user can edit the existing medley list stored in the karaoke apparatus according to his or her desire. The medley list edited by the user can be played back immediately after the editing. It is also practical to assign a code to the “custom medley list” and to store this list for reservation and performance.

In addition, the medley music piece can be played as a commercial message between performance times of karaoke music pieces in a karaoke facility so-called karaoke box. For example, request top ten music pieces and most recently distributed music pieces can be entered in a medley list, and played during other than service of karaoke music pieces to draw more requests from customers.

It should be noted that selection of the linking scheme and designation of the performance division may be left to the user at the above-mentioned sequential reservation of the medley or the custom medley list creation. When registering and storing the medley list, the linking schemes may be registered and stored at the same time. It will be apparent that the linking schemes are not limited to the above-mentioned three transition modes.

The karaoke apparatus practiced as the above-mentioned embodiment is configured to compose medley performance with sabi sections as performance divisions unless otherwise specified. This default setting may be changed to full chorus performance by deleting the introduction and ending or changed to the performance of only the first chorus.

The normal mode other than the medley mode may also accept the designation of performance division. This allows the user to delete the introduction and/or ending, to sing only the second chorus, or to sing only a sabi portion or a climax portion in the ordinary performance mode.

The karaoke apparatus practiced as the above-mentioned embodiment has the pair of the karaoke performance systems to ensure medley performance without interruption. It will be apparent that hardware circuitry such as the tone generator and the DSP may be provided only in a single system, while the register for supplying parameters to this hardware circuitry may be provided in pair, thereby providing two systems virtually.

As mentioned above, according to the invention, when desired parts or performance sections of a plurality of karaoke music pieces are specified for continuous medley performance, these parts can be linked together smoothly since the optimal scheme of the linking can be selected. This novel constitution provides customized medley performance as good as a readymade medley music piece, and eliminates necessity for especially creating karaoke music piece data for a medley, thereby realizing medley performance based on ordinary karaoke music pieces.

FIG. 8 shows an additional embodiment of the inventive karaoke apparatus. This embodiment has basically the same construction as the first embodiment shown in FIG. 1. The same components are denoted by the same references as those of the first embodiment to facilitate better understanding of the additional embodiment. The storage such as HIDD 14, ROM 11 and RAM 12 can store various data such as karaoke music data and various programs including the system control program or basic program, the sequence program and other application programs. Normally, the ROM 11 provisionally stores these programs. However, if not, any program may be loaded into the karaoke apparatus. The loaded program is transferred to the RAM 12 to enable the CPU 10 to operate the inventive karaoke apparatus. By such a manner, new or version-up programs can be readily installed in the karaoke apparatus. For this purpose, a machine-readable media such as a CD-ROM (Compact Disc Read Only Memory) 51 is utilized to install the program. The CD-ROM 51 is set into a CD-ROM drive 52 to read out and download the program from the CD-ROM 51 into the HDD 14 through the bus. The machine-readable media may be composed of a magnetic disk or an optical disk other than the CD-ROM 51.

The communication controller 15 is connected to an external host computer (not shown) through a communication network such as LAN (Local Area Network), public telephone network and INTERNET. If the internal storage does not reserve needed data or program, the communication controller 15 is activated to receive the data or program from the host or server computer. The CPU 10 transmits a request to the server computer through the controller 15 and the network. In response to the request, the server computer transmits the requested data or program to the karaoke apparatus. The transmitted data or program is stored in the internal storage to thereby complete downloading.

The inventive karaoke apparatus can be implemented by a personal computer which is installed with the needed data and programs. In such a case, the data and programs are provided to the user by means of the machine-readable media such as the CD-ROM 51 or a floppy disk. The machine-readable media contains instructions for causing the personal computer to perform the inventive medley play method as described in conjunction with the previous embodiments. Namely, the machine readable media contains instructions for causing the karaoke apparatus to perform the method of playing a medley comprising the steps of selecting a plurality of desired music pieces so as to compose a medley, designating desired sections cut out from each of the selected music pieces, sequentially playing back the designated sections of the selected music pieces to perform the medley, switching from a preceding section of one selected music piece to a succeeding section of another selected music piece during the course of performing the medley so as to musically connect the preceding section to the succeeding section by different transition modes, and selecting an optimal one of the different transition modes according to musical properties of said one selected music piece and said another selected music piece so as to musically ensure smooth connection between the preceding section and the succeeding section.

What is claimed is:

1. A karaoke apparatus comprising:

a music selector device that selects a plurality of desired music pieces so as to compose a medley;

a designator device that designates a desired section of each music piece selected by the music selector device;

a sequencer device that sequentially plays back the designated sections of the selected music pieces to perform the medley;

a connecting device that operates when the performed medley switches from a preceding section of one music piece to a succeeding section of another music piece to musically connect the preceding section to the succeeding section by different transition modes; and a mode selector device that selects an optimal one of the different transition modes according to musical properties of said one music piece and said another music piece so as to musically ensure smooth connection between the preceding section and the succeeding section.

2. A karaoke apparatus according to claim 1, wherein the music selector device selects at least three music pieces so that the medley contains at least two connections in a sequence of the designated sections, and the mode selector device can select different transition modes for the respective connections so as to individually optimize each of the connections.

3. A karaoke apparatus according to claim 1, wherein the mode selector device selects an optimal one of the different transition modes according to the musical properties of said one music piece and said another music piece in terms of at least one of volume, tempo, time and key.

4. A karaoke apparatus according to claim 1, wherein the mode selector device selects a direct transition mode such that the preceding section is directly connected to the succeeding section when the musical properties of said one music piece and said another music piece are compatible with one another, and otherwise selects an indirect transition mode such that the preceding section is indirectly connected to the succeeding section through a transient interval when the musical properties of said one music piece and said another music piece are not compatible with one another so that the transient interval can smoothly connect the preceding section to the succeeding section.

5. A karaoke apparatus according to claim 4, wherein the mode selector device selects the indirect transition mode in which the preceding section fades out and the succeeding section fades in during the transient interval.

6. A karaoke apparatus according to claim 4, wherein the mode selector device selects the indirect transition mode in which a bridge section is fitted into the transient interval between the preceding section and the succeeding section so that the bridge section musically bridges therebetween.

7. A karaoke apparatus according to claim 6, further comprising an editor device that edits the bridge section according to the music properties of said one music piece and said another music piece in terms of at least one of volume, tempo, time and key so that the music property of the bridge section is compromised to ensure the smooth connection between the preceding section and the succeeding section.

8. A karaoke apparatus according to claim 1, further comprising a pair of tone generator devices that are activated to generate musical tones of the medley, and wherein the sequencer device activates one tone generator device when playing back the preceding section and activates the other tone generator device when playing back the succeeding section.

9. A karaoke apparatus comprising:

music selector means for selecting a plurality of desired music pieces so as to compose a medley;

designator means for designating a desired section of each music piece selected by the music selector means;

sequencer means for sequentially playing back the designated sections of the selected music pieces to perform the medley;

connecting means operative when the performed medley switches from a preceding section of one music piece to a succeeding section of another music piece to musically connect the preceding section to the succeeding section by different transition modes; and mode selector means for selecting an optimal one of the different transition modes according to musical properties of said one music piece and said another music piece so as to musically ensure smooth connection between the preceding section and the succeeding section.

10. A method of playing a medley in karaoke comprising the steps of:

selecting a plurality of desired music pieces so as to compose a medley;

designating desired sections cut out from each of the selected music pieces;

sequentially playing back the designated sections of the selected music pieces to perform the medley;

switching from a preceding section of one selected music piece to a succeeding section of another selected music piece during the course of performing the medley so as to musically connect the preceding section to the succeeding section by different transition modes; and selecting an optimal one of the different transition modes according to musical properties of said one selected music piece and said another selected music piece so as to musically ensure smooth connection between the preceding section and the succeeding section.

11. A machine readable media containing instructions for causing a karaoke apparatus to perform a method of playing a medley comprising the steps of:

selecting a plurality of desired music pieces so as to compose a medley;

designating desired sections cut out from each of the selected music pieces;

sequentially playing back the designated sections of the selected music pieces to perform the medley;

switching from a preceding section of one selected music piece to a succeeding section of another selected music piece during the course of performing the medley so as to musically connect the preceding section to the succeeding section by different transition modes; and selecting an optimal one of the different transition modes according to musical properties of said one selected music piece and said another selected music piece so as to musically ensure smooth connection between the preceding section and the succeeding section.

* * * * *